(12) United States Patent
McDonald

(10) Patent No.: US 7,572,525 B2
(45) Date of Patent: Aug. 11, 2009

(54) CONCRETE CURING BLANKET

(76) Inventor: Stephen F. McDonald, 1800 Rosegarden La., Loganville, GA (US) 30052

( * ) Notice: Subject to any disclaimer, the term of this patent is extended or adjusted under 35 U.S.C. 154(b) by 0 days.

(21) Appl. No.: 11/075,460

(22) Filed: Mar. 9, 2005

(65) Prior Publication Data

US 2005/0214507 A1 Sep. 29, 2005

Related U.S. Application Data

(63) Continuation-in-part of application No. 10/968,926, filed on Oct. 21, 2004, now abandoned, and a continuation-in-part of application No. 10/897,420, filed on Jul. 23, 2004.

(51) Int. Cl.
E04B 1/16 (2006.01)
(52) U.S. Cl. .................. 428/703; 442/395; 442/398; 442/413; 264/DIG. 43; 264/31; 428/68; 428/76
(58) Field of Classification Search ............... 442/388, 442/389, 395, 398, 413; 264/DIG. 43, 31; 428/703, 68, 76
See application file for complete search history.

(56) References Cited

U.S. PATENT DOCUMENTS

| | | | |
|---|---|---|---|
| 1,999,152 A * | 4/1935 | Finley | 264/79 |
| 2,133,641 A | 10/1938 | Tompkins | |
| 4,035,543 A | 7/1977 | Draper et al. | |
| 4,485,137 A | 11/1984 | White | |
| 4,822,669 A | 4/1989 | Roga | |
| 4,900,377 A | 2/1990 | Redford et al. | |
| 5,096,748 A | 3/1992 | Balassa | |
| 5,126,201 A * | 6/1992 | Shiba et al. | 428/389 |
| 5,143,780 A | 9/1992 | Balassa | |
| 5,507,900 A | 4/1996 | Mohammed et al. | |
| 5,549,956 A | 8/1996 | Handwerker | |
| 5,780,367 A | 7/1998 | Handwerker | |
| 5,816,305 A | 10/1998 | May | |
| 5,843,554 A | 12/1998 | Katz | |
| 5,855,978 A | 1/1999 | Handwerker | |
| 5,877,097 A * | 3/1999 | West et al. | 442/327 |
| 5,904,672 A * | 5/1999 | LeMahieu et al. | 604/378 |

(Continued)

FOREIGN PATENT DOCUMENTS

DE 1002018 2/1957

(Continued)

OTHER PUBLICATIONS

"Complete Textile Glossary", definitions for wet-laid nonwoven and air-laid nonwoven.*

(Continued)

*Primary Examiner*—Elizabeth M Cole
(74) *Attorney, Agent, or Firm*—Michael J. Mehrman; Mehrman Law Offices, PC

(57) ABSTRACT

Curing blanket having a clear, transparent or opaque first layer and a second layer that is airlaid on the first layer. Another embodiment has a first layer, a second layer that is airlaid on the first layer, and a third layer disposed on the said second layer, with the second layer interposed between the first layer and the third layer. The first layer and said second layer are thermally bonded and/or latex bonded. The third layer includes a polymer release agent composed of bi-component fibers.

21 Claims, 8 Drawing Sheets

U.S. PATENT DOCUMENTS

| | | | |
|---|---|---|---|
| 5,986,166 A * | 11/1999 | Mukaida et al. | 604/368 |
| 6,033,757 A | 3/2000 | Murphy | |
| 2002/0068081 A1 * | 6/2002 | Fontenot et al. | 424/443 |

FOREIGN PATENT DOCUMENTS

| | | |
|---|---|---|
| JP | 8011122 | 1/1996 |

OTHER PUBLICATIONS

V 171-97A "Standard Specification for Sheet Materials for Curing Concrete", 1997, pp. 1-2.*
"Complete Textile Glossary", definitions for wet-laid nonwoven and air-laid nonwoven, 2001.*
EPO Search Report, May 27, 2006.
International Searching Authority, International Search Report, Aug. 23, 2006, 1-11.

* cited by examiner

CONCRETE CURING BLANKET

REFERENCE TO EARLIER APPLICATION

This application is a continuation-in-part of U.S. patent application Ser. No. 10/897,420, filed Jul. 23, 2004, by Stephen F. McDonald et al. and U.S. patent application Ser. No. 10/968,926, filed Oct. 21, 2004, by Stephen F. McDonald, both for Cement Curing Blanket.

BACKGROUND OF THE INVENTION

Producing quality hydraulic concrete or cement requires proper curing. Curing increases concrete strength, hence structural value. Proper curing is necessary for producing water-tight, durable concrete.

Curing involves chemical changes that result in setting and hardening. These chemical changes occur over a considerable period of time in the presence of water. Water retention is important in the curing of hydraulic concretes, i.e., concretes that are dependent on a hydration reaction for hardening, and concretes that are bound with hydraulic concretes. Thus, concrete must be kept wet after it has set for as long a period as is practicable.

The most common hydraulic cement for construction purposes is Portland cement. Portland cement is a heat-treated mixture primarily of calcium carbonate-rich material, such as limestone, marl or chalk, and material that is rich in $Al_2SiO_2$, such as clay or shale. Portland cement comes in several varieties that are distinguished by such characteristics as the rate of acquiring strength during curing, the amount of heat of hydration generated, and resistance to sulfate attack. Other types of hydraulic cements include aluminous cement, chalcedony cement, which is made from amorphous quartz, and Roman cement, which combines burnt clay or volcanic ash with lime and sand.

"Concrete" describes a mixture of stone, gravel or brushed rock and sand, referred to as "aggregate," which is bound by a cement. As used herein, "concrete" includes reinforced concrete, concrete that contains organic or silica-based fibers or metallic wire, cable or rods as a reinforcing substance, and polymer-cement concrete that is bound with Portland cement and a polymerized monomer or resin system. Hydraulic concrete and cement are referred to herein as "concrete." Additional information on the composition and characteristics of concrete may be found in Basic Construction Materials by C. A. Herubin and T. W. Narotta, third edition, Reston Book, Englewood, N.J., which is incorporated herein by reference.

While curing concrete may be water dependent, too much water can interfere with curing. When concrete is freshly poured, the water content thereof may be higher than that which is optimal for proper curing. Thus, some water loss during curing can be useful. However, if water loss during curing is too great, the cured concrete will exhibit reduced strength. Excess drying during curing can lead to surface crack formation.

Maintaining an optimal amount of water in contact with curing concrete optimizes the strength and durability of the concrete. For example, if concrete is kept wet for the first ten days after setting, strength and durability thereof increase 75 percent over ordinary aging at dry surface conditions. Consequently, slowing the rate of evaporative water loss from curing concrete is a widely recognized goal.

Inconsistent coverage on a curing surface, i.e. permitting bubbles or voids to occur between the curing blanket and the curing concrete surface, promotes localized surface weaknesses and discoloration.

A method for controlling excessive drying of curing concrete includes drenching with water the forms and surfaces intended for receiving the fresh concrete prior to pouring, then dampening the curing concrete with frequent sprinklings after pouring.

Another method for controlling excessive drying during curing includes, following initial wetting of the surface of freshly poured concrete, such as by applying water as a spray, mist or steam, covering the concrete with a moisture barrier. Typical moisture barriers have included burlap and cotton mats, wet rugs, moist earth or sand, sawdust and other objects likely to act as a moisture barrier. Some of these other objects have included water-proof papers and plastic films.

A further method for controlling excessive drying during curing includes applying a liquid membrane-forming composition. The composition typically contains natural or synthetic waxes or resins and a volatile carrier solvent. The composition forms, after volatilization of the carrier solvent, a moisture barrier that slows the rate of moisture loss from concrete.

Concrete curing blankets exist for covering water-wetted concrete and extending the duration of damp conditions on the curing surface thereof. One blanket is formed of coarse, woven burlap fibers carried by a thermoplastic sheet heat sealed or melted onto the fabric. Burlap blankets pose many problems including exhibiting hydrophillically greasiness, large void areas that promote non-uniform concrete surface wetting, stiffness and non-resiliency that prevents conformity to surface irregularities, and fibers that snag on concrete surfaces, which may lead to undesired markings.

Another curing blanket specifically excludes hydrophillic fibers as being prone to rot and absorb water that should wet the concrete. See, for example, U.S. Pat. No. 4,485,137, issued Nov. 27, 1984, to R. L. White for *Concrete Curing Blanket*.

What is needed is a curing blanket that maintains a uniform relative humidity environment of 100% against a curing concrete surface and conforms to irregular surfaces thereof.

SUMMARY OF THE INVENTION

The invention overcomes the disadvantages noted above by providing a concrete curing blanket that maintains a uniform relative humidity environment of 100% against a curing concrete surface and conforms to irregular surfaces thereof. To that end, the invention provides a curing blanket that has a clear or transparent first layer and a second layer airlaid that is on the first layer. The invention also provides a first layer, a second layer airlaid on the first layer, and a third layer disposed on the said second layer, with the second layer interposed between the first layer and the third layer. The first layer and said second layer are thermally bonded and/or latex bonded. The third layer includes a polymer release agent composed of bi-component fibers.

The invention provides improved elements and arrangements thereof, for the purposes described, which are inexpensive, dependable and effective in accomplishing intended purposes of the invention. Other features and advantages of the present invention will become apparent from the following description of the preferred embodiments which refers to the accompanying drawing.

BRIEF DESCRIPTION OF THE DRAWINGS

The invention is described in detail below with reference to the following figures, throughout which similar reference characters denote corresponding features consistently, wherein.

DETAILED DESCRIPTION OF THE PREFERRED EMBODIMENTS

Figure 1:
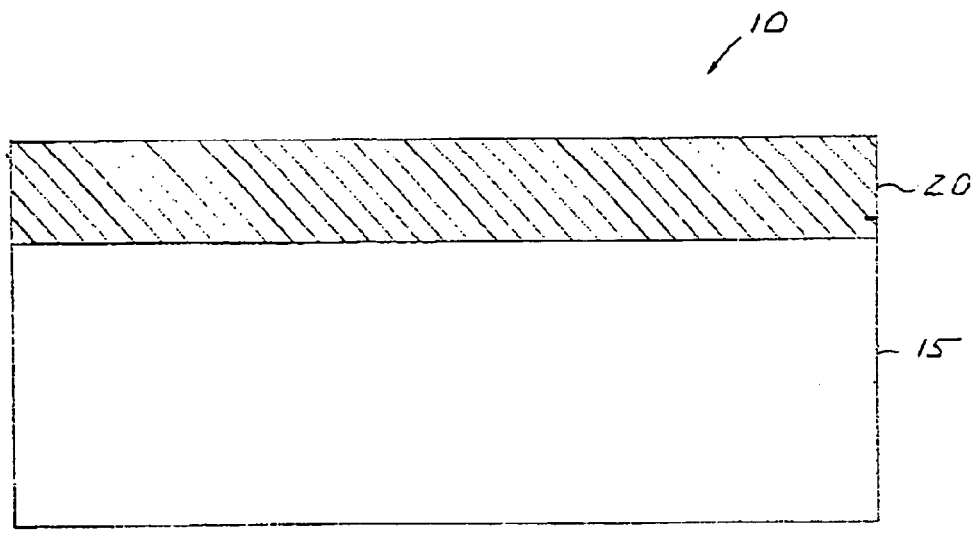
FIG. 1 is a cross-sectional detail view of an embodiment of a curing blanket constructed according to principles of the invention.

Referring to FIG. 1, an embodiment of a curing blanket 10 constructed according to principles of the invention has a first layer 15 that is airlaid on a second layer 20. Curing blanket 10 maintains an optimal amount of water in contact with an entire surface of curing concrete, which optimizes the strength and durability of the concrete when cured.

As used herein, "airlaid" refers to a fibrous structure formed primarily by a process involving deposition of air-entrained fibers onto a mat, typically with binder fibers, and typically followed by densification and thermal bonding. In addition to traditional thermally bonded airlaid structures, those formed with non-tacky binder material and substantial thermally bonded, "airlaid," according to the present invention, also includes co-form, which is produced by combining air-entrained dry, dispersed cellulosic fibers with meltblown synthetic polymer fibers while the polymer fibers are still tacky. "Airlaid" also includes an airformed web to which binder material is added subsequently. Binder may be added to an airformed web in liquid form, e.g., an aqueous solution or a melt, by spray nozzles, direction injection or impregnation, vacuum drawing, foam impregnation, and so forth. Solid binder particles also may be added by mechanical or pneumatic means.

Because airlaid hydrogen bonded materials tend to disintegrate with prolonged exposure to water, airlaid natural fiber mats have not been considered optimal for concrete curing. The invention overcomes this problem by incorporating natural cellulose material with synthetic and multibond fibers in the resultant airlaid structure.

First layer 15 contains bi-component or multibond fibers, fluff pulp, ethylene vinyl acetate and latex. More specifically, first layer 15 includes 5-50%, preferably 30%, synthetic bonding fibers. Synthetic fibers contribute as much as 3.8-4.25%, preferably 4%, by weight. Bi-component and multibond fibers are coaxial fibers having an inner component with a higher melting temperature than an encasing outer component. When heated, the outer component melts for bonding with other elements, while the inner component does not melt, thus lending integrity and strength to the bonded material. The inner and outer components may be selected from polypropylene, polyethylene or other compositions suitable for the purposes described.

First layer 15 also includes 50-89%, preferably 70%, natural cellulose fluffed pulp fiber. The fluff pulp, preferably, is derived from southern softwood, northern softwood, southern hardwood, northern hardwood, kanaf or eucalypus fibers. These materials provide short fibers that offer great surface area for trapping and absorbing water. The fibers derived from protein based, cotton, agave, plant stalk (bast) fibers of other mats tend to be much longer, hence afford less surface area for trapping and absorbing water. These longer fibers also have waxes, resins and some lignin present that discourage entrapping water. These longer fibers are less absorbent and exhibit geometries that are not as favorable as the present cellulose from soft and/or hardwood fibers. Further, the pulp fibers of the present invention also tend to provide greater tensile strength than the fibers of other mats.

The fluff pulp of first layer 15 is obtained from a Kraft process, rather than mechanical pulping. Mechanical pulping does not produce a clean product, free of the waxes, resins, silicone, turpentine that are present in the virgin materials recited above. Bleached Kraft pulp provides optimal absorption capabilities by producing clean cellulose. The Kraft process produces a bulkier cellulose with a white absorptive component that prevents discoloration of a concrete surface in contact therewith. Discoloration commonly occurred with "burlap style" materials.

Ethylene vinyl acetate promotes great integrity and reduces dusting.

The latex bonding agent is sprayed on natural fibers or part of the bi-component or multibond fibers aids in strengthening the adhesion among the bi-component or multibond fibers and other materials in first layer 15. The latex binders may contribute as much as 5-35%, preferably 20%, by weight.

The unique composition of curing blanket 10 enables it to wick moisture from oversaturated areas to dry areas. As edges 35 of curing blanket 10 dry, curing blanket 10 wicks moisture from more hydrated areas to edges 35. Curing blanket equalizes the moisture saturation level therethrough.

Another embodiment of first layer 15 contains 5-20% super absorbent fibers. Super absorbent fibers are absorbent fibers coated with absorbent material.

First layer 15 is thermally bonded preferably in a basis weight ranging from 40 gsm to 500 gsm with a backing having a laminated, extruded or coated polyethylene or polymer latex material. Ideally, the latex material is a two-part manufactured composition that renders it insoluble in water. The water insolubility discourages disintegration of curing blanket 10 or, more specifically, first layer 15, which would lead to imperfections in the finished surface of a concrete slab. First layer 15, preferably, is spray coated, which lowers production costs.

One part of the latex composition is a high-viscosity polymer filler agent, while the other part is a water resistant agent obtained by polymerization. A binder dispersed in water forms films by fusion of the plastic filler particles as the water evaporates during manufacturing or curing.

First layer 15 and second layer 20 may be bonded with a special water resistant adhesive having a soft point of 210° F.

Second layer 20 may provide a vapor barrier, but not a protection barrier. To this end, second layer 20 may include an extruded polymer film as an impervious backing.

Alternatively, second layer 20 may provide for vapor and/or fluid transmission. To this end, second layer 20 may include a perforated film, preferably constructed of a polymer or metallic material. The number of perforations in second layer 20 may range from one to 500 per square foot. Each perforation has a diameter ranging from 0.001 mm to 0.1 mm. The perforations may define a pin hole, half moon hole, butterfly hole, full hole or other configuration suited for purposes described herein.

The perforations provide for rewetting curing concrete, where curing blanket 10 is adapted to cure concrete, and vapor transmission, where curing blanket 10 is adapted to absorptive applications.

Perforated embodiments of second layer 20 are especially suited for curing concrete highway constructions, pavements, bridges and the like.

Second layer 20 may be UV enhanced and/or opaque in color.

Second layer 20 preferably is clear or transparent. This allows for ready visual perception of water in curing blanket 10 and on a slab surface. This provides owners and contractors tremendous labor savings in tending the curing slab and blanket to ensure that adequate water is present on all portions of a slab to be cured. Workers readily may see and take steps to eliminate bubbles or correct other non-uniformities with respect to contact between curing blanket 10 to the surface of a curing concrete slab, or moisture provided thereby.

Second layer 20 may define a biodegradable perforated moisture film, having multiple color choices. Second layer 20 may be adapted for pet industry or curing blanket uses. For example, for pet industry applications, vapor transmission is useful for allowing moisture to pass through, while the airlaid structure of first layer 15 retains bulk of pet waste. Such structure extends the use or life of the product.

A target caliper or thickness for curing blanket 10 is 0.5-5.0 mm, preferably 1.80 mm. A target tensile strength for curing blanket 10 is 1295-1350 g/50 mm, preferably 1300 g/50 mm. A target absorbency for curing blanket 10 is 16.5-18.5 g/g, preferably 17 g/g.

Figure 11:
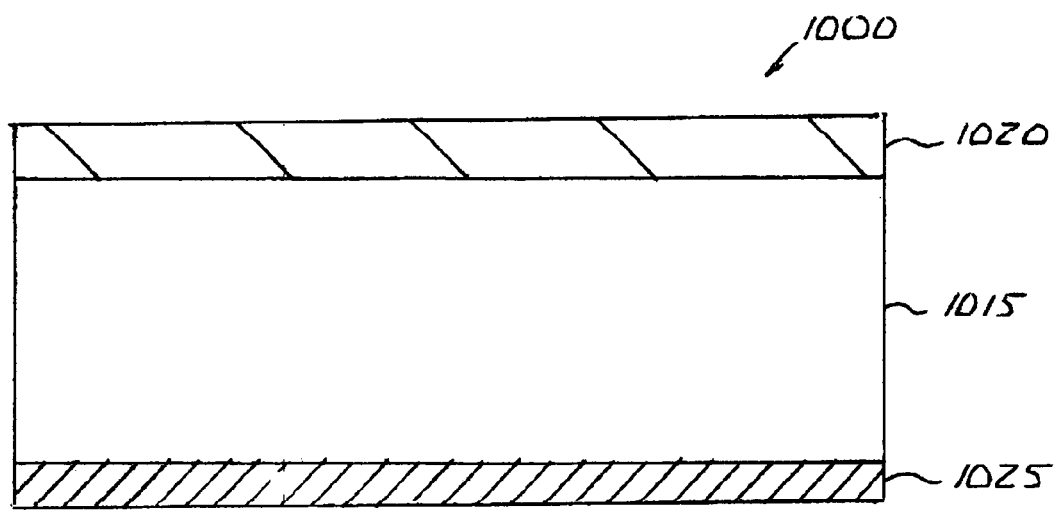
FIG. 11 is a cross-sectional detail view of another embodiment of a curing blanket constructed according to principles of the invention.

Referring to FIG. 11, another embodiment of a curing blanket 1000 constructed according to principles of the invention has a first layer 1015 that is airlaid on a second layer 1020, similar to first layer 15 and second layer 20 of curing blanket 10. Curing blanket 1000 also has a third layer or cover sheet 1025 disposed on first layer 1015. First layer 1015 and second layer 1020 respectively are constructed similarly to first layer 15 and second layer 20, thus discussed no further.

Third layer 1025 includes a polymer release agent and kraft pulp fiber. Preferably, third layer 1025 contains about 20% kraft pulp fiber and about 80% polymer bi-component fiber, and has a 0.05-0.254 mm thickness. The fluff pulp, in addition to providing a repository for the release agent, defines a membrane that separates first layer 1015 from a curing concrete surface, for reasons described below. Preferably, the pulp fiber is composed of cellulose, hemicelluyloses and lignin in extractive free form. Preferably, the pulp is derived from southern and northern softwoods and hardwoods, kanaf, eucalypus fibers The pulp retains water and also provides for transmitting fluids to first layer 1015.

Third layer 1025 suits curing blanket 1000 well for roller compacted or pervious concrete. These concrete installations are thinner than and provide less structure than slab concrete installations. For example, these thinner installations often serve as highway edges or parking lot surfaces, where structural requirements may not be as high as for such installations as aircraft landing strips. Similar to concrete or asphalt pavements for highway, parking or similar applications, the structural integrity of roller compacted concrete is highly dependent on the high strength curing of the cement paste that bonds this thin layer together.

Roller compacted concrete involves preparing an anticipated pavement area and pouring concrete similar to other concrete installations. Once the concrete has achieved a desired set, a heavy roller rolls over the slab, increasing the density of the materials composing the concrete, which enhances the hardness and strength of the slab once cured.

The compaction and thinness of the rolled slab promotes dehydration. If unchecked, this increased dehydration can cause cracks to develop, which would weaken and mar the appearance of a resultant cured surface. Accordingly, rolled concrete workers wet and place concrete blankets as soon as possible, preferably within fifteen minutes of rolling. Waiting too long to place the hydrated blankets on the curing slabs would render the curing concrete less able to absorb fluids that otherwise would have promoted proper curing.

To avoid the adverse effects of roller-enhanced dehydration, rolled slabs need curing blankets that retain and provide to the slab a greater amount of water. The unique absorbent properties provided by the airlaid natural fibers of first layer 10 meet this challenge.

Additionally, unlike conventional troweling or smoothing of a slab surface, rolling the slab causes minute peaks or globules to form on the slab surface. Similar to the mechanics of Velcro®, the peaks can catch or snag fibers of a fibrous curing blanket. The unique loft and release agent provided by third layer 1025 effectively buffers the fibers of first layer 1015 from and discourages snagging by the peaks.

Figure 2:
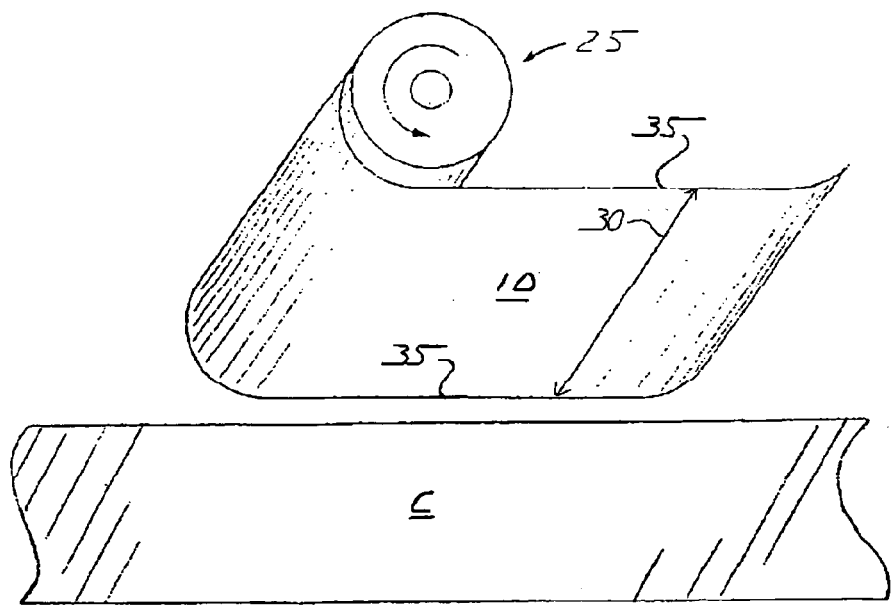
FIG. 2 is an environmental perspective view of a method of using the curing blanket of FIG. 1 according to principles of the invention.
Figure 3:
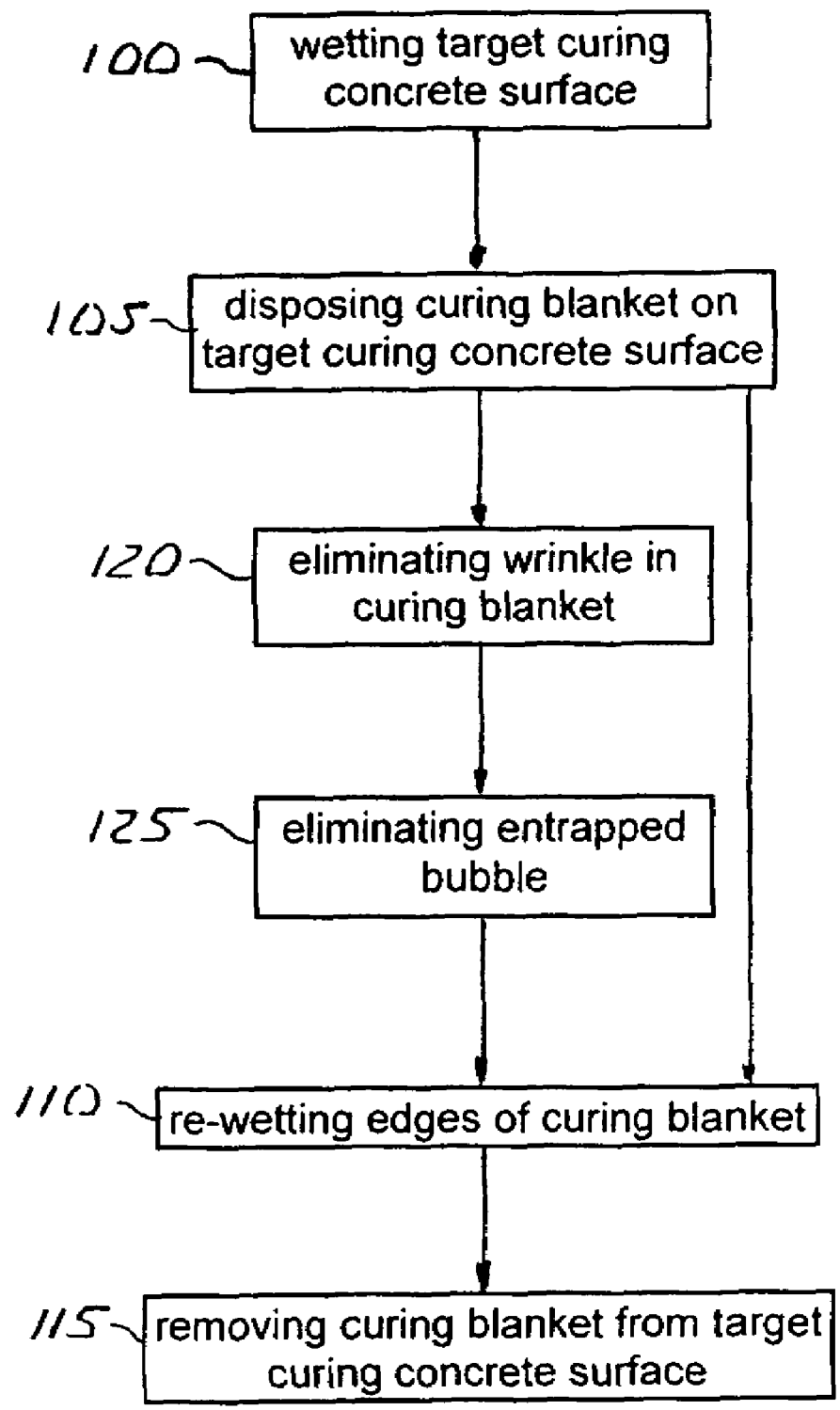
FIG. 3 is a schematic representation of the method of FIG. 2.

Referring to FIGS. 2 and 3, a method of curing concrete according to principles of the invention includes a step 100 of wetting a target curing concrete surface C and a step 105 of disposing curing blanket 10 on target curing concrete surface C with first layer 15 nearest thereto. The method preferably includes a step 110 of re-wetting edges of curing blanket 10 so that water wicks to all areas of curing blanket 10. The method also includes a step 115 of removing curing blanket 10 from target curing concrete surface C after target curing concrete surface C is cured.

In practice, prior to performing step 100 or step 105, a manufacturer ships rolls 25 of curing blanket 10 on pallets (not shown) to a site where concrete is to be poured. On each roll 25, curing blanket 10 has a width 30 defined by edges 35. Each pallet contains approximately twelve rolls 25 that provide approximately 10,000 square feet of coverage. Each roll 25 is encased and protected with shrink wrap (not shown) to minimize exposure to contamination until curing blanket 10 is applied to target curing concrete surface C during the wet cure process. The shrink wrapping allows curing blanket 10 to be stored outside during construction.

Step 100 involves misting or flooding target curing concrete surface C as specifications require.

After removing the protective shrink wrap (not shown), concrete workers perform step 105 by slowly rolling curing blanket 10 onto target curing concrete surface C. Properly aligning and rolling curing blanket 10 reduces the possibility of forming wrinkles in curing blanket 10 or trapping air thereunder.

Once disposed on target curing concrete surface C, curing blanket 10 becomes saturated with water and increases in weight dramatically. The weight increase allows for rolling out multiple adjacent lengths of curing blanket 10, preferably with an overlap of two to four inches, without having to lap, tape, weigh down or otherwise restrain adjacent edges 35 to maintain uniform, void-free coverage of target curing concrete surface C. Since the airlaid structure of curing blanket 10 is so absorptive and takes longer to dry out, moisture, hence weight, dissipate slower, further eliminating the need to restrain edges 35.

For best results, water should be allowed to pond in front of roll 25 as it is rolled along target curing concrete surface C.

In the unlikely event a wrinkle (not shown) occurs in curing blanket 10 during application, the method may include a step 120 of eliminating a wrinkle in curing blanket 10, which would be performed between step 105 and step 110. Step 120 involves cutting curing blanket 10 across width 30 of the affected area with a razor. Three- to four-foot sections on each side of the wrinkled area are peeled away then reapplied to target curing concrete surface C by gently, simultaneously stretching and lowering the sections back onto the wet cure surface.

Because curing blanket 10 absorbs and retains significant amounts of water, curing blanket 10 adheres to target curing concrete surface C like no other curing blanket and insures a more complete, uniform wet cure and surface appearance that other curing blankets.

In the unlikely event a bubble (not shown) forms under curing blanket 10 after application, the method may include a step 125 of eliminating an entrapped bubble. Step 125 involves applying a roller squeegee or a wide soft bristle push-squeegee to guide the bubble (not shown) to the nearest untapped edge 35. Squeegee roller application ensures 100% contact between curing blanket 10 and target curing concrete surface C. Removing entrapped bubbles in this manner is preferred for slab on grade/tilt up construction projects.

Step 110, preferably, involves gently spraying water around edges 35 of curing blanket 10 in an amount sufficient for curing blanket 10 to wick water to all areas thereof and providing 100 percent humidity to target curing concrete surface C, as recommended for a wet curing application.

Step 115 involves folding curing blanket 10 back onto itself in three- to four-foot sections until an entire curing blanket section is folded. The foregoing is repeated until all of curing blanket 10 disposed on target curing concrete surface C is folded into a removable condition. As curing blanket 10 is intended for one-time use, once removed, folded curing blanket 10 should be disposed of properly.

Embodiments of curing blanket 10 have been tested extensively. Samples of curing blanket 10 measured approximately 8 by 12 inches and had a 1.0 mm/ply thickness.

Figure 4:
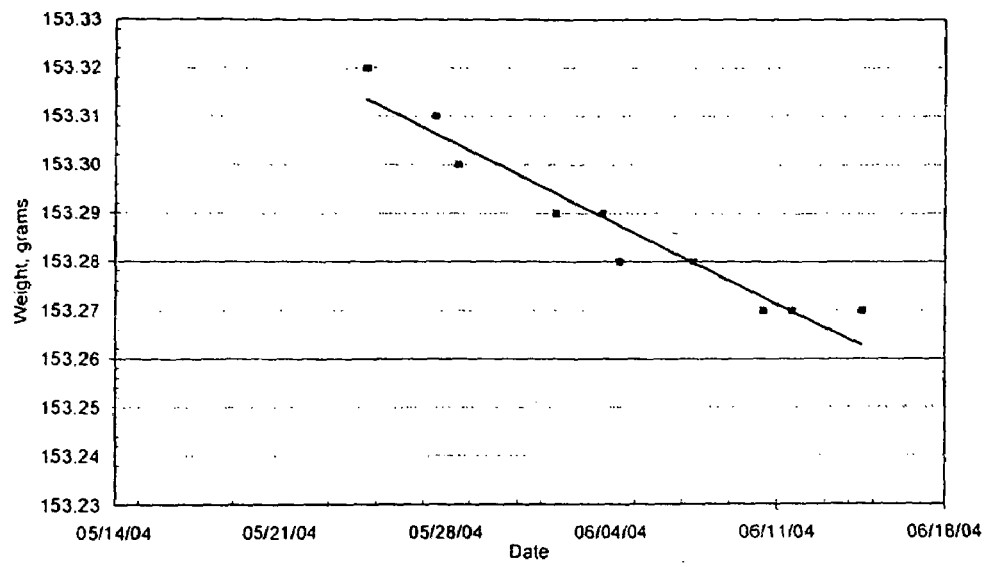
FIGS. 4-10 are graphical representations of properties of the curing blanket of FIG. 1.
Figure 5:
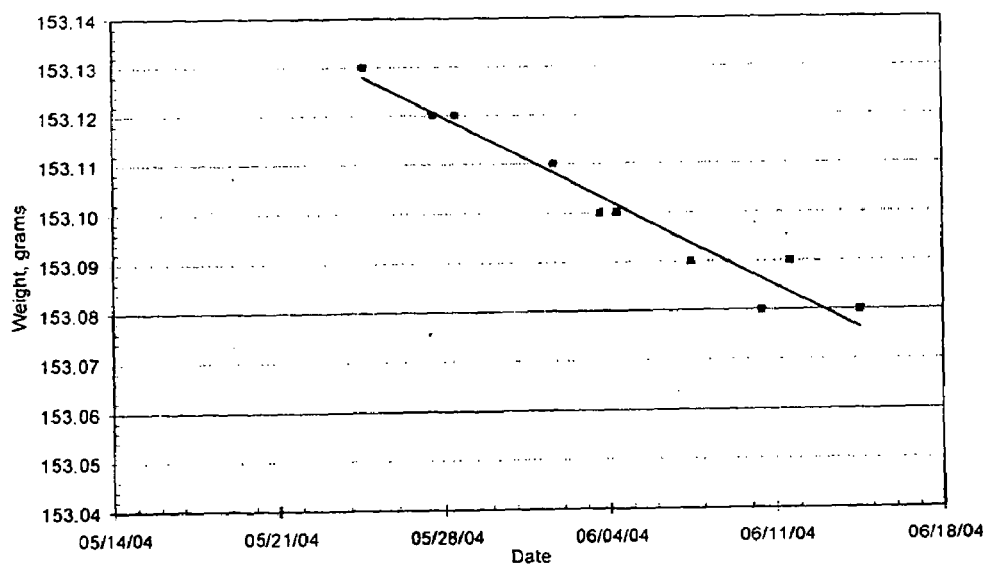

Table 1 summarizes results of a water vapor transmission and permeance test performed on some embodiments of curing blanket 10 in general accordance with ASTM E96-00, "Standard Test Methods for Water Vapor Transmission of Materials" using the water method. FIGS. 4-7 show the portion of data used to calculate results. FIGS. 4 and 5 pertain to test samples oriented such that first layer 15 was vertically superior to second layer 15, defining a fibers up position, and FIGS. 6 and 7 pertain to test samples oriented such that second layer 15 was vertically superior to first layer 15, defining a fibers down position.

sealed in the permeability cups over 6 mL reagent water (ASTM D1193 Type IV). A non-volatile, proprietary sealant was used to create a leak-free seal between the film and the cup faying surfaces. The specimens remained in the test room at 73±0.60° C. and 50±2% RH and were weighed in the room twice per week. The specimens were weighed until the weight change versus time was constant per ASTM E96. The referenced material meets the performance requirement for water vapor transmission rate of no more than 10 grams/m$^2$ in 24 hours (0.42 grams/hm$^2$) in ASTM C 171-03, "Standard Specification for Sheet Materials for Curing Concrete."

Figure 6:
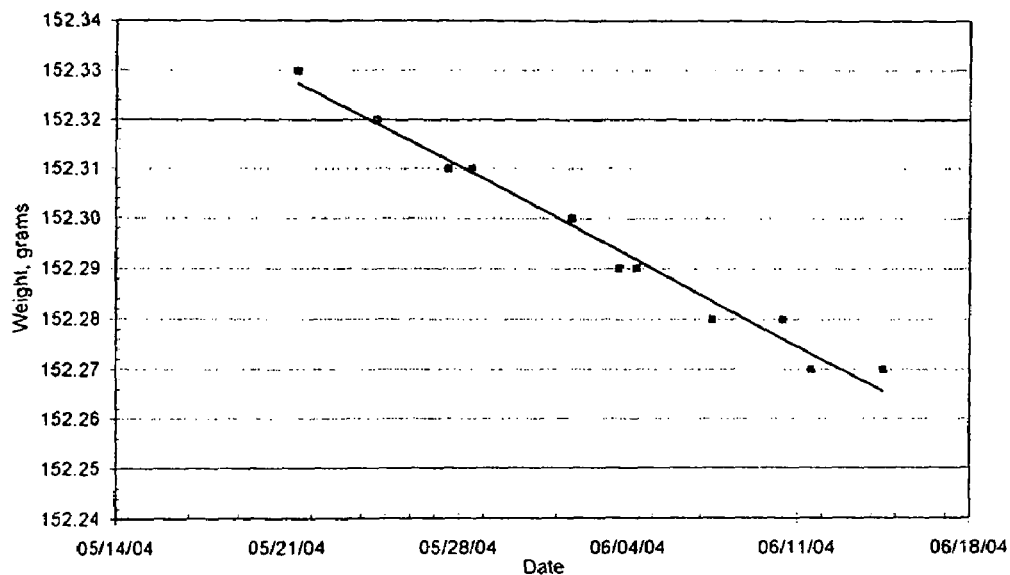
Figure 7:
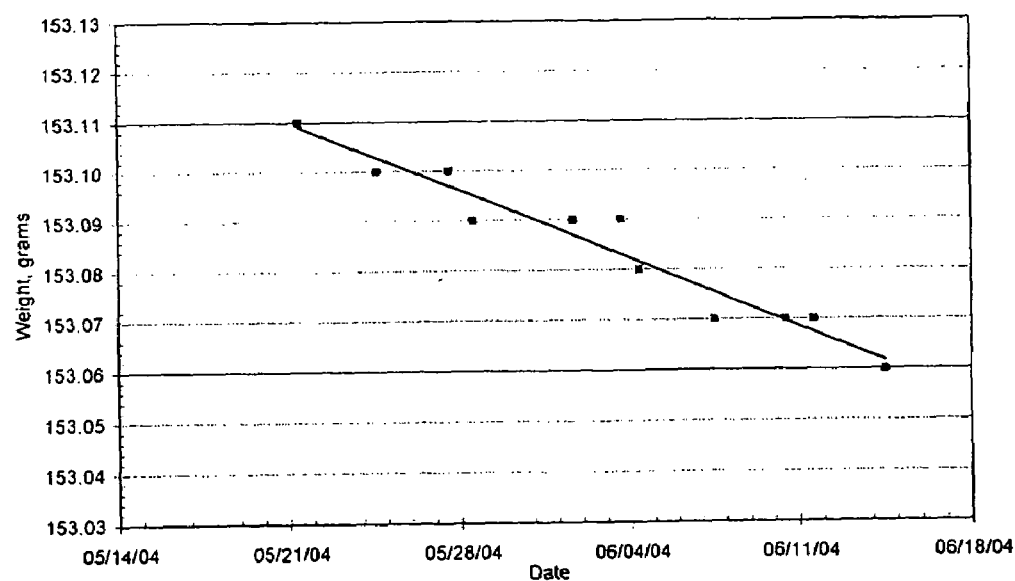

Results for Specimens 1 through 3 were similar, as shown on FIGS. 4-6. Specimen 4, as shown on FIG. 7, developed a visible biological growth on the fiber side mid-way through the testing. Specimen 4 has lower water vapor transmission. The accuracy of the balance is 0.01 grams, therefore all data points fall on the horizontal grid lines.

Another test measured the water retention of curing blanket 10 in accordance with ASTM C156-98, "Standard Test Method for Water Retention by Concrete Curing Materials." The test involved a composition of mortar containing by weight: 2,660 g concrete; 6,500 g standard sand; and 1,064 mL water to produce flow 35±5. The flow was 35.5% and water-to-concrete ratio was 0.4. Curing blanket 10 met the performance requirement for water loss of no more than 0.55 kg/sq m in 72 hours per ASTM C171-97a, "Standard Specification for Sheet Materials for Curing Concrete."

The specific composition of curing blanket 10 provides a thickness, MD dry tensile strength, CD dry tensile strength, CD wet tensile strength, absorbency rate, capacity, brightness, and caliper that allow curing blanket 10 to lay completely flat on, provide increased surface-to-surface contact with, and promote desired, consistent coloration of curing concrete. MD dry tensile strength refers to the tensile strength of a dry sample in the direction of the fibers. CD dry tensile strength refers to the tensile strength of a dry sample transversely to the direction of fibers. CD wet tensile strength refers to the tensile strength of a wet sample transversely to the direction of fibers. Concrete cured with curing blanket 10 are free of localized weaknesses and discolorations caused by bubbles or other contact discontinuities between the curing surface and a curing blanket. Further, increased weight from

TABLE 1

Water Vapor Transmission and Permeance Data

| Specimen Identification and orientation | Water vapor transmission | | | | Permeance | |
|---|---|---|---|---|---|---|
| | SI units (grams/h · sq m) | | Inch-pound units grains/h · sq ft | | perm (grains/ h · sq ft-in. Hg) | |
| | average | | average | | average | |
| Specimen 1 fibers up | 0.040 | 0.040 | 0.057 | 0.057 | 0.14 | 0.14 |
| Specimen 2 fibers up | 0.040 | | 0.057 | | 0.14 | |
| Specimen 3 fibers down | 0.042 | 0.037 | 0.060 | 0.053 | 0.14 | 0.13 |
| Specimen 4 fibers down | 0.032 | | 0.046 | | 0.11 | |
| Average | 0.040 | | 0.058 | | 0.13 | |

For this test, sample material was cut into four 52 mm diameter circles and placed on anodized aluminum permeability cups manufactured by Sheen Instruments Ltd. Two specimens were placed in the fibers up position and two in the fibers down position. The specimens were allowed to equilibrate for seven days in a test room maintained at 73±0.60° C. and 50±2% relative humidity (RH). The specimens then were absorption causes the saturated blanket to remain in place longer and require less attention.

Figure 8:
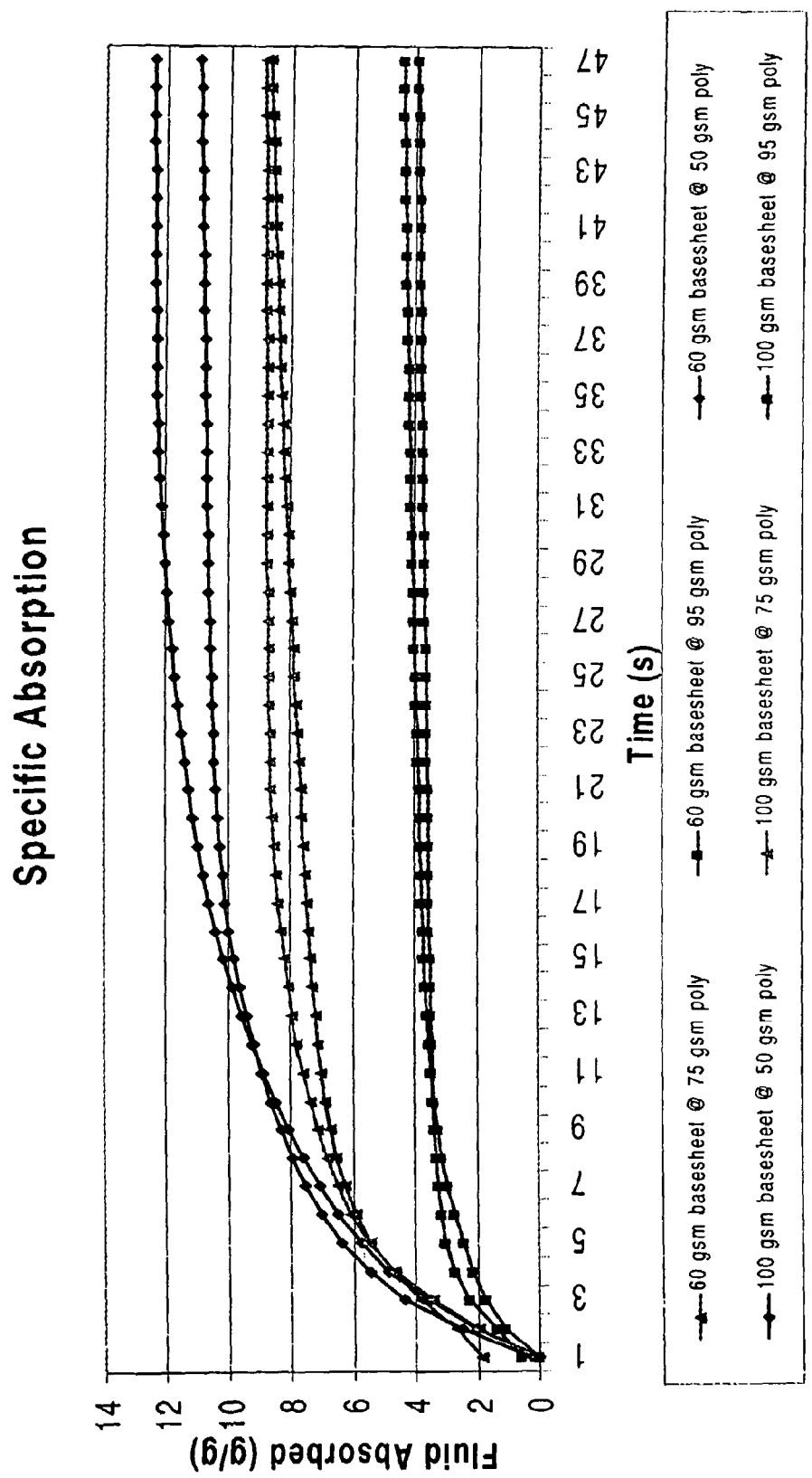
Figure 9:
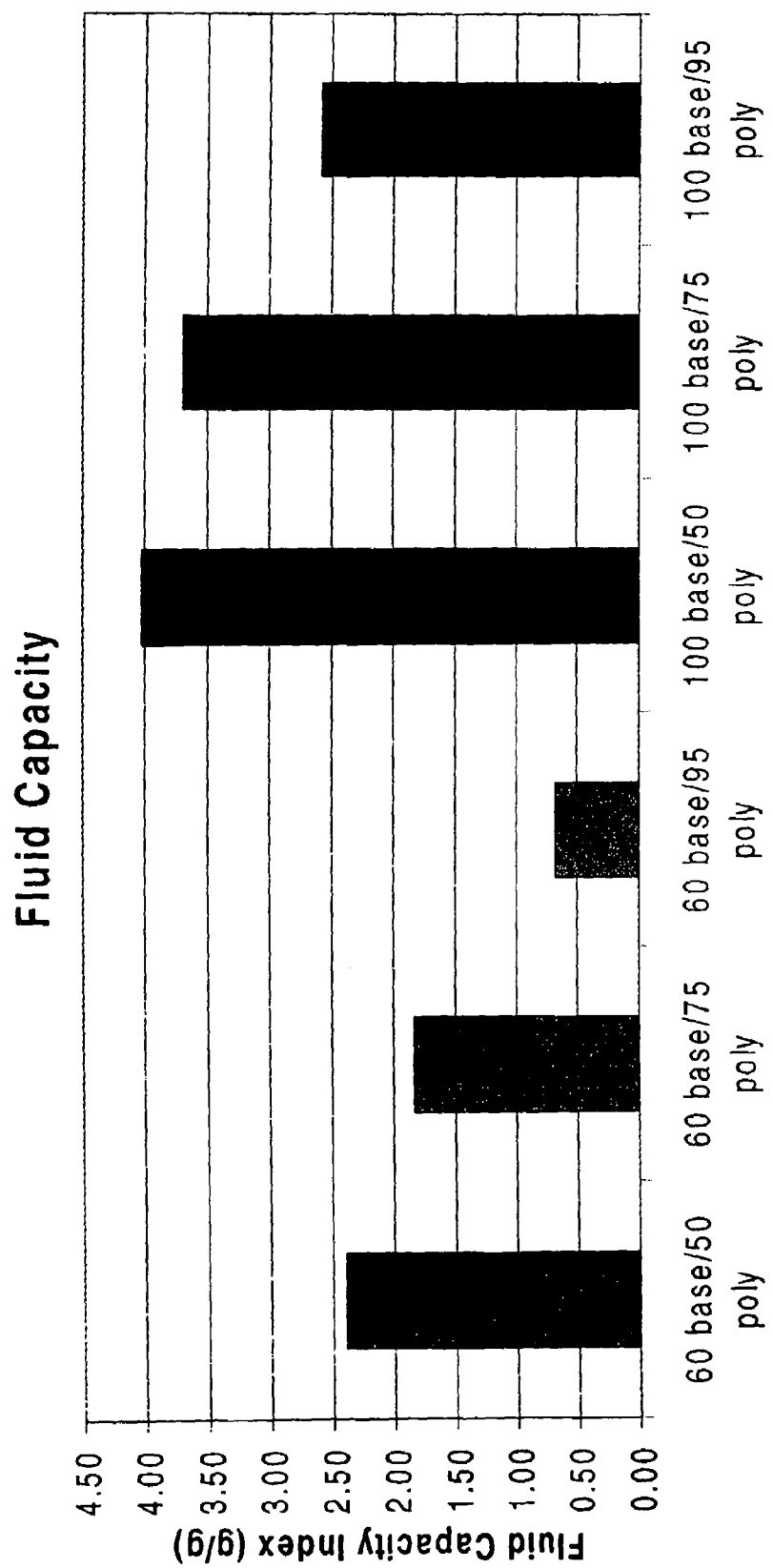
Figure 10:
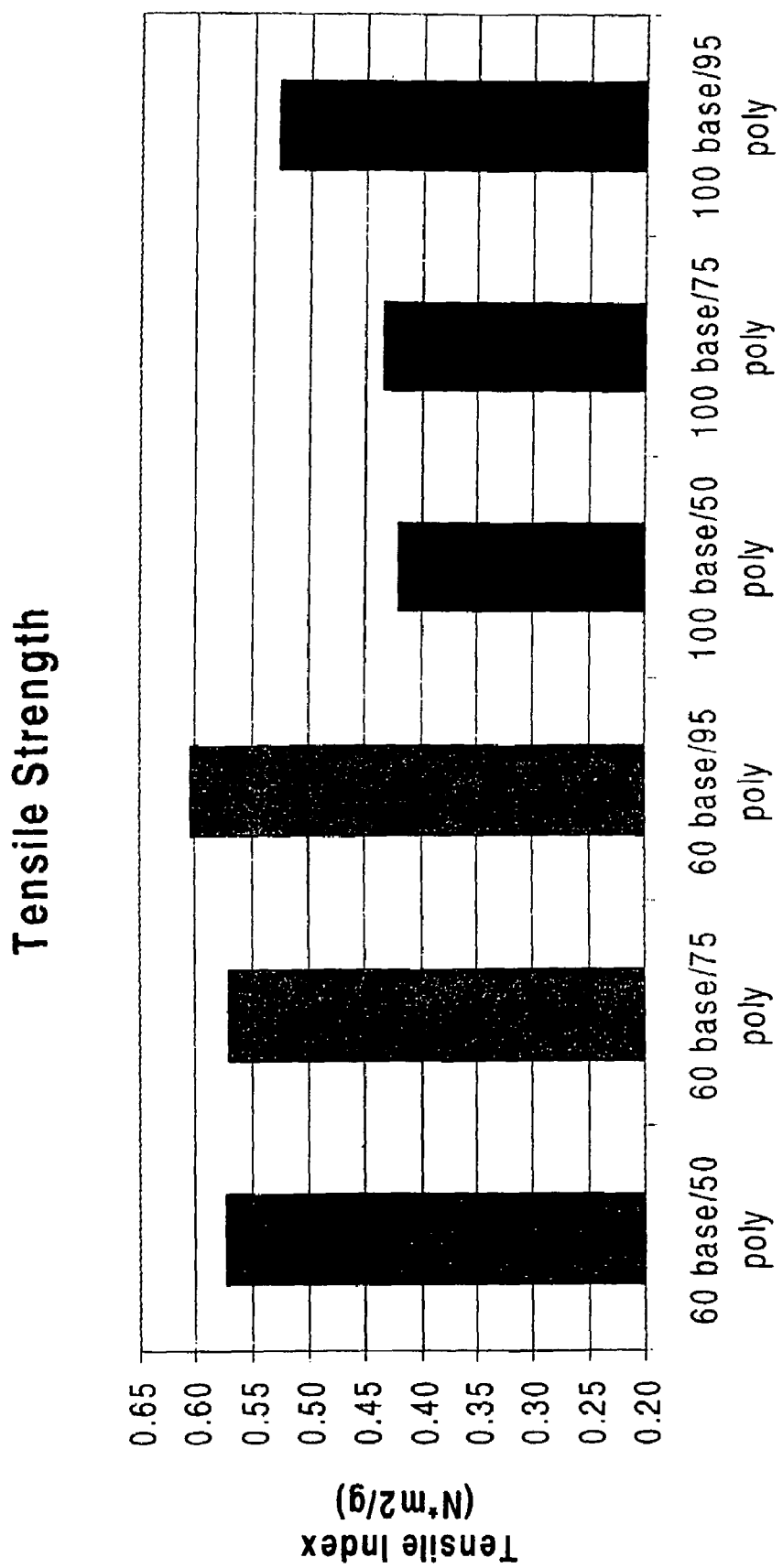

FIGS. 8-10 graphically describe, respectively, specific absorption, fluid capacity and tensile strength of various configurations of curing blanket 10. Materials exhibit two different tensile strengths: (1) yield, which is equivalent to the maximum amount of tensile stress the material can withstand yielding or stretching; and (2) failure, which is equivalent to the stress required to achieve material failure or tearing. Table 2, below, presents data averaged from three tests of various configurations of curing blanket 10.

TABLE 2

Preliminary Test Data

| Sample Type | Basis Wt. (gsm) | Caliper (mm) | Pulp Up Mullen (psi) | Pulp Up Mullen (kPa) | Pulp Down Mullen (psi) | Pulp Down Mullen (kPa) | Burst Index (kPa m2/g) | Tensile (N/5 cm) |
|---|---|---|---|---|---|---|---|---|
| 60 gsm pulp sheet @ 30# poly | 109 | 0.389 | 16 | 110 | 18.8 | 130 | 1.19 | 62 |
| 60 gsm pulp sheet @ 45# poly | 129 | 0.398 | 20.5 | 141 | 22.4 | 154 | 1.2 | 73 |
| 60 gsm pulp sheet @ 60# poly | 157 | 0.296 | 25.8 | 178 | 27.3 | 188 | 1.2 | 95 |
| 100 gsm pulp sheet @ 30# poly | 151 | 0.808 | 28 | 193 | 35.7 | 246 | 1.63 | 64 |
| 100 gsm pulp sheet @ 45# poly | 158 | 0.79 | 24.1 | 166 | 30 | 207 | 1.31 | 69 |
| 100 gsm pulp sheet @ 60# poly | 201 | 0.718 | 30.3 | 209 | 37.7 | 260 | 1.3 | 106 |
| Non-woven poly w/ poly coating | 305 | 1.646 | 237.5 | 1636 | 257.2 | 1772 | 5.82 | 485 |

| Sample Type | Tensile Index | % Elongation | Capacity (g) | Capacity Index (g/g) | Capacity Retention | Capacity Retention Index |
|---|---|---|---|---|---|---|
| 60 gsm pulp sheet @ 30# poly | 0.57 | 11.64 | 9.34 | 2.38 | 4.01 | 1.02 |
| 60 gsm pulp sheet @ 45# poly | 0.57 | 10.45 | 8.54 | 1.84 | 4 | 0.86 |
| 60 gsm pulp sheet @ 60# poly | 0.6 | 8.65 | 3.88 | 0.69 | 2.21 | 0.39 |
| 100 gsm pulp sheet @ 30# poly | 0.42 | 12.54 | 21.99 | 4.03 | 6.49 | 1.19 |
| 100 gsm pulp sheet @ 45# poly | 0.44 | 12 | 21.04 | 3.7 | 9.76 | 1.71 |
| 100 gsm pulp sheet @ 60# poly | 0.53 | 10.55 | 18.72 | 2.59 | 7.54 | 1.04 |
| Non-woven poly w/ poly coating | 1.59 | 64.06 | 17.36 | 1.58 | 1.34 | 0.12 |

The invention is not limited to the particular embodiments described herein, rather only to the following claims.

I claim:

1. A system for wet curing concrete, comprising:
a curing slab of concrete having a surface; and
a curing blanket disposed against the surface of curing concrete, comprising:
a first airlaid layer consisting of a composition of binder material and natural cellulose bleached fluff pulp fiber derived from wood through Kraft processing bonded to a second layer,
the second layer forming a vapor barrier,
the first layer forming a wicking layer positioned between the vapor barrier and the surface of curing concrete, and
wherein the wicking layer is operative to wick moisture from oversaturated areas to dry areas to equalize moisture saturation within the wicking layer and apply substantially uniform wetness against the surface of curing concrete.

2. The system of claim 1, wherein the natural cellulose material is free of waxes, resins, silicon and turpentine.

3. The system of claim 1, wherein the binder material is bi-component or multibond synthetic binder fibers thermally bonding the first layer to the second layer.

4. The system of claim 1, wherein the binder material is latex.

5. The system of claim 1, wherein the binder material is ethyl vinyl acetate.

6. The system of claim 1, wherein the second layer is sufficiently transparent to permit visual perception of water and bubbles between the second layer and the surface of curing concrete.

7. The system of claim 1, wherein the second layer comprises a polymer film and the curing blanket exhibits water vapor transmission at a rate of no more than 10 grams per square meter in 24 hours.

8. The system of claim 1, wherein the curing blanket exhibits the following characteristics:
   a caliper ranging from 0.5 to 5.0 mm;
   a tensile strength ranging from 1,295 to 1,350 g/50 mm; and
   an absorbency in the range of 16.5 to 18.5 g/g.

9. The system of claim 1, further comprising a third layer comprising a composition of binder material and natural cellulose material bonded to the first layer, with the first layer positioned between the second layer and the third layer, wherein the third layer is configured to transmit moisture and discourage snagging between the curing blanket and the surface of curing concrete.

10. A method for curing concrete, comprising the steps of:
   providing a curing blanket comprising an airlaid wicking layer consisting of a composition of binder material and natural cellulose bleached fluff pulp fiber derived from wood through Kraft processing bonded to a vapor barrier layer;
   wetting a surface of curing concrete;
   positioning the curing blanket on the wet surface of curing concrete with the wicking layer positioned between the vapor barrier and the surface of curing concrete; and
   wherein the wicking layer wicks moisture from oversaturated areas to dry areas to equalize moisture saturation within the wicking layer and apply substantially uniform wetness against the surface of curing concrete.

11. The method of claim 10, wherein the first layer is free of waxes, resins, silicon and turpentine.

12. The method of claim 10, wherein the binder material is bi-component or multibond synthetic binder fibers thermally bonding the first layer to the second layer.

13. The method of claim 10, wherein the binder material is latex.

14. The method of claim 10, wherein the binder material is ethyl vinyl acetate.

15. The method of claim 10, wherein the second layer is sufficiently transparent to permit visual perception of water and bubbles between the second layer and the surface of curing concrete.

16. The method of claim 10, wherein the second layer comprises a polymer film and the curing blanket exhibits water vapor transmission at a rate of no more than 10 grams per square meter in 24 hours.

17. The method of claim 10, wherein the curing blanket exhibits the following characteristics:
   a caliper ranging from 0.5 to 5.0 mm;
   a tensile strength ranging from 1,295 to 1,350 g/50 mm; and
   an absorbency in the range of 16.5 to 18.5 g/g.

18. The method of claim 10, further comprising the step of bonding a third layer comprising a composition of binder material and natural cellulose material to the first layer, with the first layer positioned between the second layer and the third layer, wherein the third layer is configured to transmit moisture and discourage snagging between the curing blanket and the surface of curing concrete.

19. The method of claim 10, further comprising the steps of:
   airlaying the first layer on the second layer;
   bonding the first layer to the second layer;
   rolling the concrete curing blanket with the first layer bonded to the second layer into one or more rolls; and
   wherein the step of positioning the curing blanket on the surface of curing concrete comprises unrolling the rolls of curing blanket onto the wet surface of curing concrete.

20. The method of claim 19, further comprising the steps of:
   allowing the concrete to cure with the curing blanket against the wet surface of curing concrete;
   after the concrete has cured, folding the curing blanket back against itself multiple times to dispose the curing blanket in removable condition;
   removing the curing blanket from the cured concrete.

21. The method of claim 19, further comprising the step of:
   after the curing blanket has been positioned on the surface of curing concrete, wetting around edges of the curing blanket and allowing the wicking layer to wick moisture from the edges to dry areas to equalize moisture saturation within the wicking layer and apply substantially uniform wetness against the surface of curing concrete.

* * * * *